United States Patent [19]

Martini et al.

[11] 4,263,176

[45] Apr. 21, 1981

[54] COLOR-STABLE BRIGHTENERS FOR DETERGENTS

[75] Inventors: Thomas Martini, Bad Soden am Taunus; Helmut Mengler, Frankfurt am Main; Günter Rösch, Bad Soden am Taunus; Günter Hohlfeld, Wiesbaden, all of Fed. Rep. of Germany

[73] Assignee: Hoechst Aktiengesellschaft, Fed. Rep. of Germany

[21] Appl. No.: 94,830

[22] Filed: Nov. 16, 1979

[30] Foreign Application Priority Data

Nov. 21, 1978 [DE] Fed. Rep. of Germany ....... 2850382

[51] Int. Cl.[3] ........................ C09K 11/06; C11D 1/14; C11D 3/28; C11D 3/42

[52] U.S. Cl. ............................... 252/543; 252/174.13; 252/174.23; 252/301.23; 252/301.34; 252/301.35; 252/401; 252/402; 252/403; 252/524; 252/535; 252/554; 542/461

[58] Field of Search ...................... 252/174.13, 174.23, 252/301.23, 301.34, 301.35, 401, 402, 403, 543, 524, 535, 554; 542/461

[56] References Cited

U.S. PATENT DOCUMENTS

| | | | |
|---|---|---|---|
| 3,655,574 | 4/1972 | Frischkorn | 542/461 |
| 3,726,814 | 4/1973 | Lancz | 252/543 |
| 3,846,324 | 11/1974 | Lohmann | 252/543 X |
| 3,951,960 | 4/1976 | Heath | 252/301.23 |
| 3,951,965 | 4/1976 | Mengler | 252/301.23 |

FOREIGN PATENT DOCUMENTS

| | | | |
|---|---|---|---|
| 764910 | 9/1971 | Belgium | 252/543 |
| 1204123 | 9/1970 | United Kingdom | 252/106 |
| 1210952 | 11/1970 | United Kingdom | 252/543 |

*Primary Examiner*—Dennis L. Albrecht
*Attorney, Agent, or Firm*—Connolly and Hutz

[57] ABSTRACT

Brighteners for detergents consisting of a mixture of 4,4'-bis-(2-morpholino-4-anilino-1,3,5-triazinylamino)-stilbene-2,2'-disulfonic acid-di-Na salt and from 5 to 50% by weight, calculated on said brightener, of another brightener of the formula

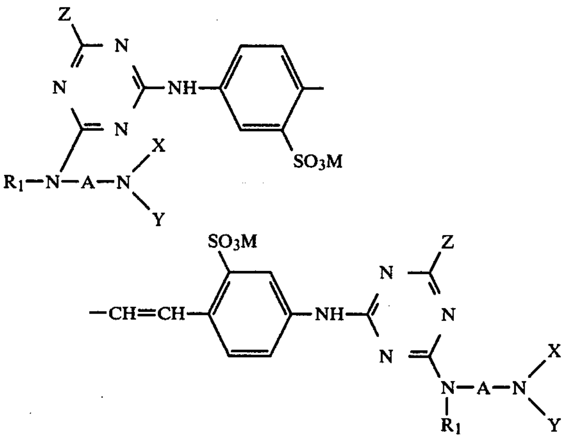

in the above formula, M is an alkali metal cation, preferably sodium, X is a group of the formula —$COR_2$ or —$SO_2R_3$, $R_2$ being $C_1$-$C_8$-alkyl and $R_3$ being $C_1$-$C_5$-alkyl, $C_4$-$C_8$-cycloalkyl, phenyl or toluyl, Y is hydrogen or $C_1$-$C_5$-alkyl, A is $C_3$-$C_6$-alkylene, $R_1$ is hydrogen, $C_1$-$C_5$-alkyl, $C_4$-$C_8$-cycloalkyl, or a group of the formula

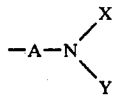

and Z is an anilino group, a chloroanilino group or a morpholino group. Said brightener mixtures are color-stable and do not show any green discoloration even after a prolonged storage in a moist atmosphere.

4 Claims, No Drawings

COLOR-STABLE BRIGHTENERS FOR DETERGENTS

When certain optical brighteners, especially the brightener of the formula 1 indicated below, are added to detergents containing secondary alkane sulfonates, the mixtures turn green, as has been well-known. This tinge of green which mainly occurs with high atmospheric humidity and on prolonged storage at elevated temperature is, however, not desired since the detergent industry desires a pure white or blue tinge, especially with household detergents. On the one hand, the industry will not do without secondary alkane sulfonates as surfactants and, on the other, it wants to derive profit from the favorable price, the good affinity and the high degree of whiteness of the said brightener having the tendency to acquire a greenish hue. It is, therefore, the objective of the present invention to modify the brightener of the aforesaid type in such a manner that washing powders containing same do no longer turn green upon prolonged storage in a moist atmosphere.

It has now been found that the discoloration as described above can be avoided by mixing the brightener having the tendency to acquire a greenish hue with determined other brighteners. It is, therefore, the subject of the present invention to provide color-stable brighteners for detergents consisting of a mixture of a brightener of the formula 1

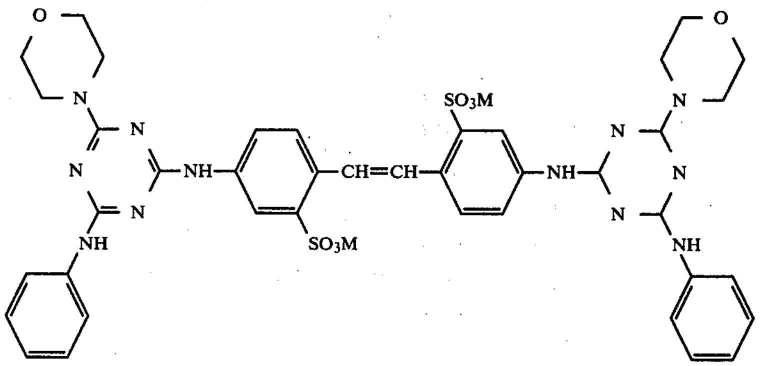
(1)

and from 5 to 50, preferably from 10 to 30% by weight, calculated on the brightener of the formula 1, of a brightener of the formula 2

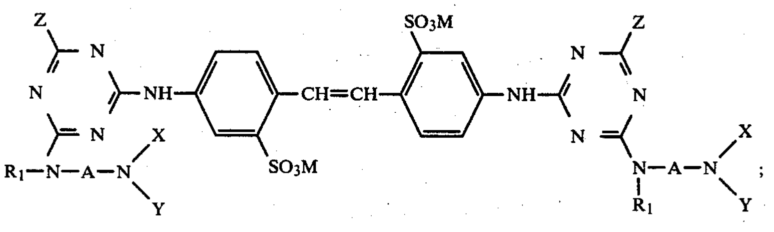
(2)

in the above formulae, M is an alkali metal cation, preferably sodium, X is a group of the formula $—COR_2$ or $—SO_2R_3$, $R_2$ being $C_1$–$C_8$-alkyl and $R_3$ being $C_1$–$C_5$-alkyl, $C_4$–$C_8$-cycloalkyl, phenyl or toluyl, Y is hydrogen or $C_1$–$C_5$-alkyl, A is $C_3$–$C_6$-alkylene, $R_1$ is hydrogen, $C_1$–$C_5$-alkyl, $C_4$–$C_8$-cycloalkyl, or a group of the formula

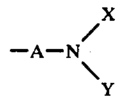

and Z is an anilino group, a chloroanilino group or a morpholino group.

Preference is given especially to those mixtures which contain a brightener of the formula 2, wherein the group

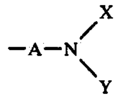

represents $—(CH_2)_3NHCOCH_3$ or

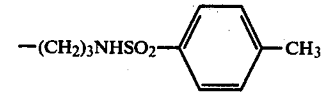

and $R_1$ is hydrogen or methyl. The preparation of these compounds has been described in detail in German Offenlegungsschrift No. 24 44 784. The two brighteners of formulae 1 and 2 may be employed in their pure form or in a formulation which is common in commerce and comprises, besides the brightener, inorganic salts as extenders. The weight ratio of the brighteners to each other may vary within wide limits and is generally within the values indicated above. Higher portions of brightener 2 are naturally also possible, however, they do not involve a substantial improvement in practice. The mixture of the two types of brightener is prepared most easily by way of an intense mechanical mixing of the two components. It is also possible to introduce the two brighteners into water or a solvent, while stirring, and to dry and pulverize the slurry obtained. Another variant comprises spraying a slurry of the two brighteners.

Another improvement with regard to preventing the green discoloration with the brightener of the formula 1 may be achieved by treating this brightener, prior to mixing it with a brightener of the formula 2, with from 1 to 100% by weight of a polyvinyl alcohol, calculated on the weight of said brightener.

The polyvinyl alcohol to be used for this purpose can be fully or partially saponified, the degree of saponification being in the range of from about 60 to 100%, preferably 80 to 100%. The average degree of polymerization of the polyvinyl alcohol varies from 300 to 10,000, preferably 450 to 5,500. Besides homopolymers of vinyl alcohol, copolymers of vinyl alcohol can be used, for example acrylamido copolymers, ester copolymers, copolymers with allyl derivatives, or modified polyvinyl alcohols as well as polyvinyl alcohols grafted with ethylene glycol. The preparations according to the invention can be prepared by thoroughly stirring the mixture of the optical brightener and the required amount of an aqueous solution of polyvinyl alcohol and drying it. The dry cake obtained is then pulverized. According to a preferred embodiment, the brightener preparation is dried by known methods in a spray apparatus, for example at an inlet temperature of from 150° to 350° C., preferably 200° to 220° C.

The content of polyvinyl alcohol in the brightener in its pure form or as commercial product should not be inferior to 1% by weight, preferably it is not below 5% by weight. With increasing content of polyvinyl alcohol the color is more and more prevented from changing so that an upper limit is rather subject to economical considerations. According to experience an amount of polyvinyl alcohol exceeding 200% by weight does no longer bring about a substantial improvement. In general, 10 to 50% by weight of polyvinyl alcohol, calculated on the brightener, will be sufficient. It has proved to be important to mix the polyvinyl alcohol in the form of an aqueous solution or in partially dissolved form with the brightener. Dry blended mixtures have a very little effect only. The brightener of the formula 1 treated in this manner with polyvinyl alcohol is then mixed with a brightener of the formula 2 in the quantitative ratio indicated above.

The above-described brightener mixtures are added to the washing powder in the amounts common in practice. Normally, washing powders contain from 0.1 to 0.5% by weight of optical brighteners. The other composition of the washing powders has been known from literature and need not be described in detail.

By mixing the brightener of the formula 2 with the brightener of the formula 1, a greening or discoloration effect in detergents is prevented, said combination not causing any alteration of the degree of whiteness, as compared with the use of the brightener of formula 1 alone. This greening or discoloration effect is especially pronounced with washing powders containing alkane sulfonates and more particularly secondary alkane sulfonates as anionic surfactants. The term alkane sulfonate is intended to include mixtures of mono- and polyfunctional secondary alkane sulfonates, for example in the form of their sodium salts. The secondary alkane sulfonates have from 10 to 30 carbon atoms. According to the technical requirement in each case the content of alkane sulfonates in the washing powder can be in the range of from 0 to 30%. The secondary alkane sulfonates can also be used in admixture with other surfactants, for example alkyl-benzene sulfonates or non-ionic surfactants. The content of alkyl-benzene sulfonate, for example sodium dodecyl-benzene sulfonate, or of non-ionic surfactant, for example an eightfold oxethylated $C_{12}$-$C_{15}$ alcohol, can be from 0 to 100% of the total amount of surfactant.

The following Examples illustrate the present invention.

EXAMPLE 1

A mixture of 0.07 g of a commercial brightener of the formula 1 (70% of active compound, NaCl as extender) and 0.042 g of the brightener of the formula 3 (50%, NaCl as extender)

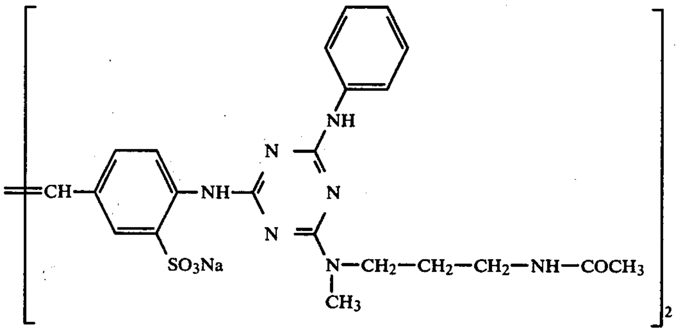

formula 3 is introduced, while stirring, into 20 g of an aqueous slurry of 60% of secondary alkane sulfonate having a chain distribution of $C_{13}$-$C_{18}$. Even after a storage of several weeks, no greening effect could be found, whereas a mixture of 20 g of the above-mentioned slurry and 0.07 g of the brightener 1 has turned green after 2 to 3 days.

The same result is obtained, if instead of the Na salt of the compound of formula 3 there is used the free acid.

EXAMPLE 2

A mixture consisting of 3 g of secondary alkane sulfonate, 0.07 g of a commercial brightener of the formula 1 (70% strength) and 0.021 g of a brightener of formulae 3 to 10 and having the formulation indicated in each case is introduced by stirring into a slurry of 22 g of a commercial washing powder without brightener and 20 ml of water.

The above slurry is stored for 18 hours at 45° C. in a drying cabinet, together with a comparative sample which only contains 0.07 g of the brightener of the formula 1. Thereafter, the comparative sample shows an intense green discoloration, whereas the white color of the test samples has remained unaltered.

The same test result is obtained, if instead of the commercial washing powder there are employed 22 g of a mixture of 40 parts by weight of pentasodium triphosphate
20 parts by weight of sodium perborate tetrahydrate
14 parts by weight of sodium sulfate
6 parts by weight of sodium metasilicate . 5 $H_2O$
2 parts by weight of magnesium silicate
3 parts by weight of carboxymethyl cellulose
3 parts by weight of fatty alcohol ($C_{16}$–$C_{18}$).

Brighteners used:

formula 3

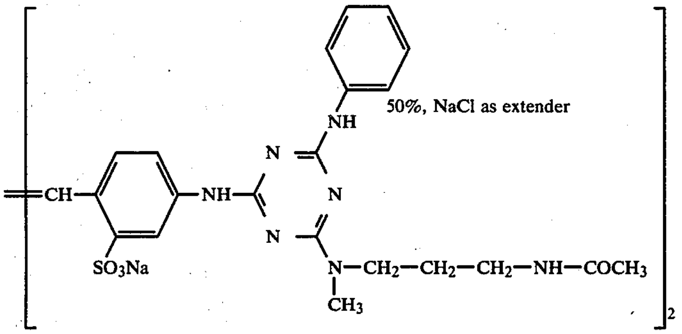

formula 4

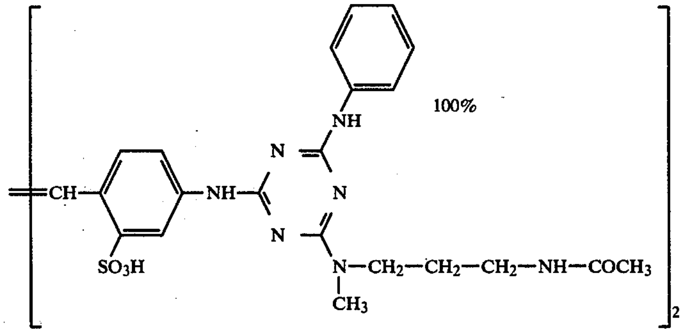

formula 5

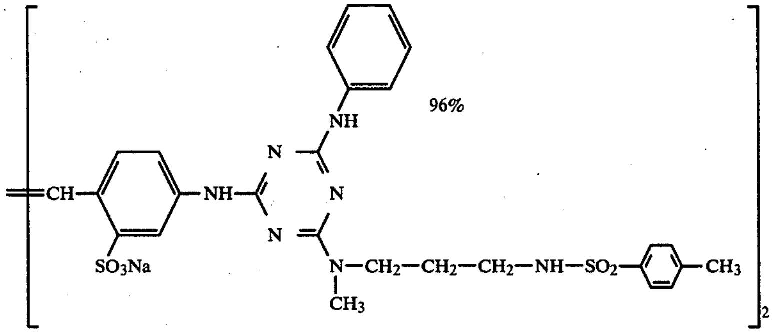

formula 6

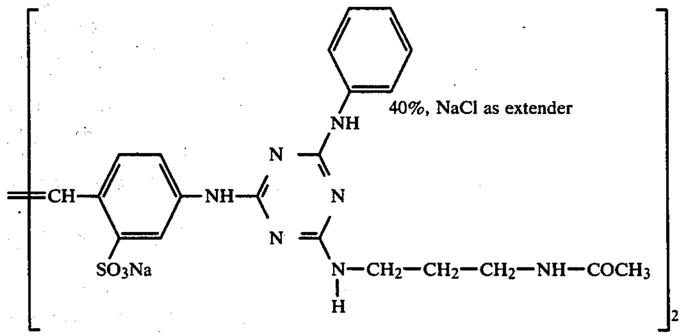

-continued

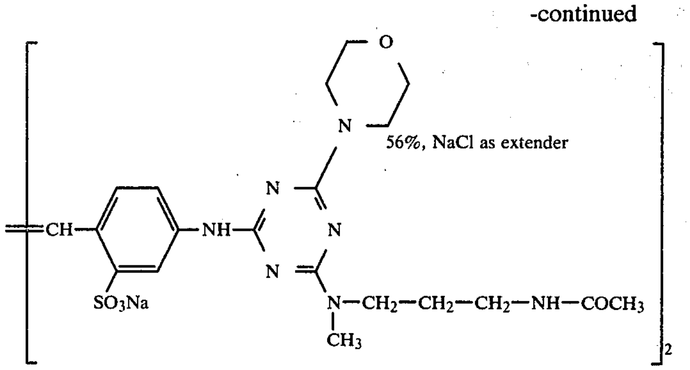

56%, NaCl as extender formula 7

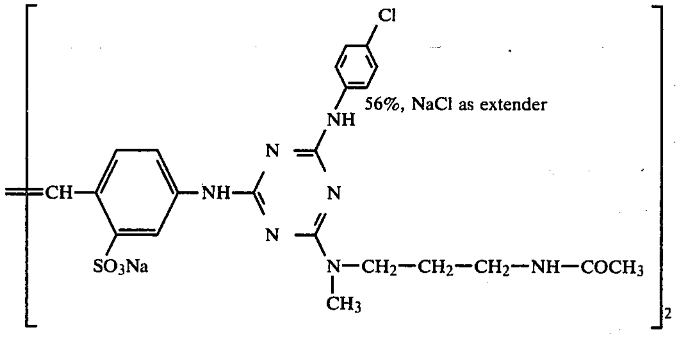

56%, NaCl as extender formula 8

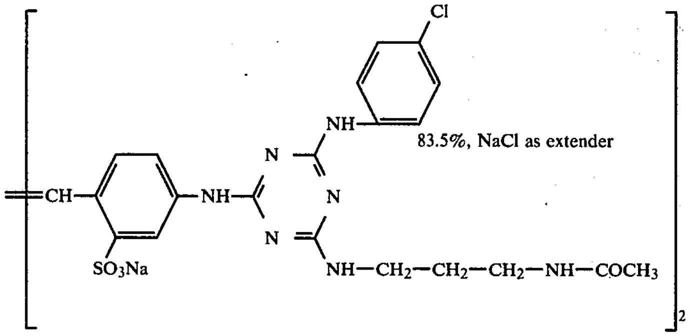

83.5%, NaCl as extender formula 9

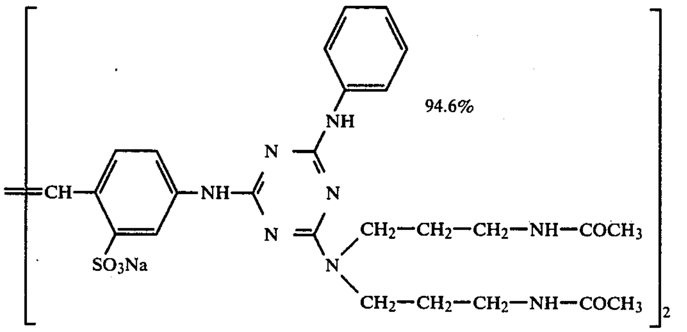

94.6% formula 10

EXAMPLE 3

A mixture of 350 g of a commercial brightener of formula 1 in its white to pastel modification (70%, with NaCl as extender) with a solution of 135 g of polyvinyl alcohol (P 520, degree of saponification 80%) in 800 ml of water is atomized in a spray-drying apparatus with an inlet temperature of 210° to 215° C., an air outlet temperature of 110° to 115° C. and an overpressure of 4 bars, with a nozzle speed of about 32,000 revolutions per minute. The sprayed and dried product, a white to pastel powder, contains about 28% of polyvinyl alcohol.

With the brightener thus modified and by way of intense mechanical mixing, for example in a shaking machine, there are prepared mixtures having an equal content of active substance together with the above-specified brighteners 3 to 10, the mixtures being subsequently mixed with 3 g of 60% secondary alkane sulfonate. The resulting mixture is then introduced into a slurry of 22 g of commercial washing powder and 20 ml of water.

Whereas a comparative sample comprising the same total amount of brightener of the formula 1 turns green after about 15 to 16 hours of storage, the washing powder obtained when using the brightener of the formula 1 modified with PVA in admixture with the brighteners of formulae 3 to 10 remains purely white. The same result is also obtained, if the content of PVA is only 12%.

EXAMPLE 4

The following brightener compositions are prepared:

1. 56 g of a commercial brightener of the formula 1 (70%, with NaCl as extender);
2. 110 g of a commercial brightener of the formula 1 (70%, with NaCl as extender) which has been modified according to Example 3 with 28% of polyvinyl alcohol (P 520, degree of saponification 80%);
3. a mixture of 56 g of the commercial brightener of the formula 1 (70%, with NaCl as extender) and 33.6 g of the brightener of the formula 3 (50%, with NaCl as extender);
4. a mixture of 78 g of a brightener of the formula 1 modified with 28% of PVA (P=520, degree of saponification 80%) according to Example 3 and 33.6 g of a brightener of the formula 3 (50%, with NaCl as extender).

The brighteners or brightener mixtures thus prepared, which with the exception of mixture 2show the same content of brightener of the formula 1 as active substance (39 g), are each added to a washing powder slurry of the following composition:

water: 14,000 g
carboxymethyl cellulose: 340 g
$NaHCO_3$: 280 g
secondary alkane sulfonate: 3,600 g
water glass of 40° Be: 4,230 g
pentasodium triphosphate: 12,000 g
sodium sulfate: 3,100 g In a counter-current hot spray apparatus the slurry is atomized through a one-substance nozzle (diameter 3.5 mm) at an air inlet temperature of 95° C. and a pump pressure of 70 bars overpressure. The resulting white powder is adjusted to a total water content of 30% and stored at 50° C. in a drying cabinet. The following results are found for the different powders:

1. Under storage conditions, the washing powder containing only the pure brightener turns green already after 2 to 3 days.
2. The brightener modified with 28% of polyvinyl alcohol maintains its purely white color for 2 to 3 weeks.
3. With mixture No. 3, the washing powder remains unaltered for about 6 weeks under the extreme test conditions applied.
4. In the case of mixture 4, no discoloration could be observed even after 5 months.

What is claimed is:

1. A washing powder containing a secondary alkane sulfonate in an amount, which in the absence of the formula 2 brightener, is ordinarily sufficient to discolor an optical brightener of the formula 1, said washing powder containing a mixture consisting of a brightener of the formula 1

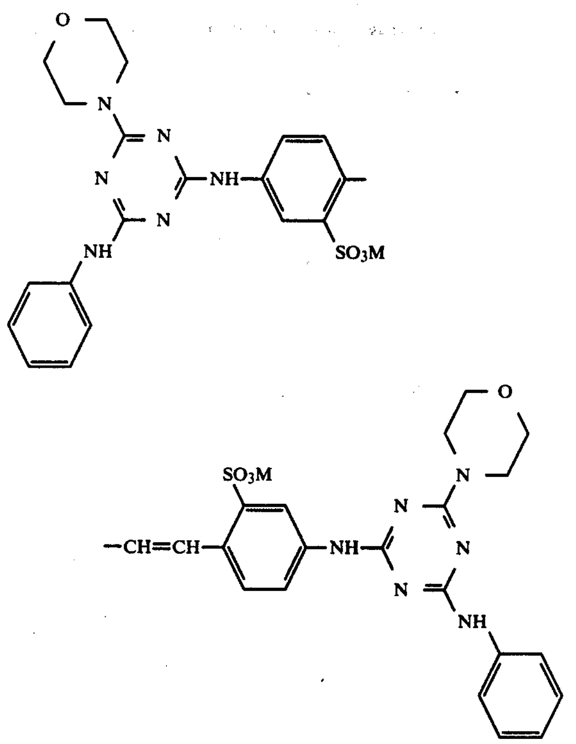

and from 5 to 50% by weight, calculated on the brightener of the formula 1, of a brightener of the formula 2

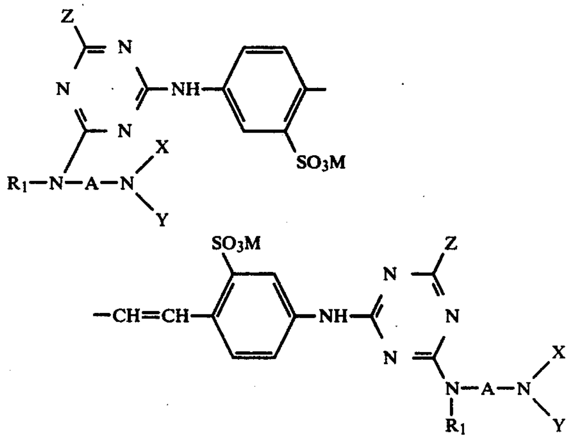

in the above formulae, M is an alkali metal cation, preferably sodium, X is a group of the formula $-COR_2$ or $-SO_2R_3$, $R_2$ being $C_1$-$C_8$-alkyl and $R_3$ being $C_1$-$C_5$-alkyl, $C_4$-$C_8$-cycloalkyl, phenyl or toluyl, Y is hydrogen or $C_1$-$C_5$-alkyl, A is $C_3$-$C_6$-alkylene, $R_1$ is hydrogen, $C_1$-$C_5$-alkyl, $C_4$-$C_8$-cycloalkyl or a group of the formula

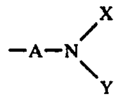

and z is an anilino group, a chloroanilino group or a morpholino group.

2. Brighteners as claimed in claim 1, which contain a brightener of the formula 2, wherein the group

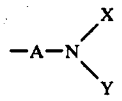

stands for $—(CH_2)_3NHCOCH_3$ or

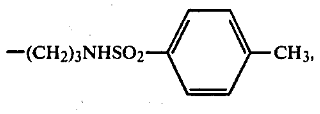

and $R_1$ is hydrogen or methyl.

3. Brighteners as claimed in claim 1, which consist of a brightener of the formula 1 and from 10 to 30% by weight, calculated on the brightener of formula 1, of a brightener of the formula 2.

4. Brighteners as claimed in claim 1, wherein the brightener of the formula 1 has been modified with 1 to 100% by weight, calculated on the weight of said brightener, of polyvinyl alcohol.

* * * * *